July 15, 1947.                P. E. PEARSON                2,424,188
              SIDE SEAM FOR SHEET METAL CAN BODIES
                        Filed Dec. 19, 1944

Inventor
Paul E. Pearson
By
Mason, Porter & Diller
Attorneys

Patented July 15, 1947

2,424,188

UNITED STATES PATENT OFFICE 2,424,188

SIDE SEAM FOR SHEET METAL CAN BODIES

Paul E. Pearson, Chicago, Ill., assignor to Continental Can Company, Inc., New York, N. Y., a corporation of New York Application December 19, 1944, Serial No. 568,838

1 Claim. (Cl. 220—75)

The invention relates to new and useful improvements in a side seam for sheet metal can bodies.

An object of the invention is to provide a side seam for can bodies wherein the edge portions are lapped and the inner lap is so formed as to avoid exposure of the raw edge of the metal on the inner side of the can and wherein the lap portions are joined by spot welding and the seam portions are further joined and sealed by a solder bond.

A further object of the invention is to provide a side seam structure of the above type wherein the inner lap is folded back upon itself and disposed between the lap portions.

A still further object of the invention is to provide a seam of the above type wherein the spot welds are disposed at intervals along the extreme edge of the outer lap section.

The invention has to do with a sheet metal can body and more particularly the side seam of the can body. The edge portions of the can body are lapped and are joined both by spot welding and by solder bonding.

Figure 1:
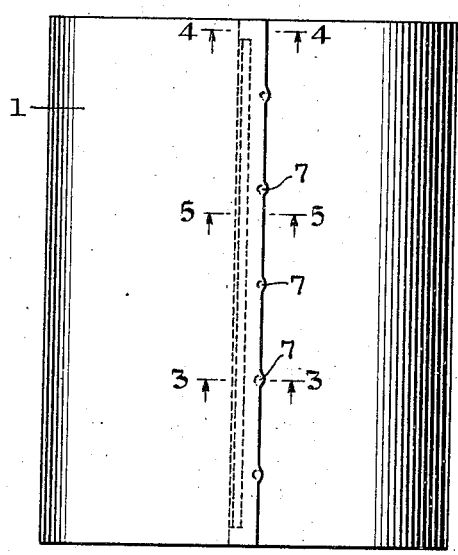
Figure 1 is a view showing a can body in side elevation embodying the improved side seam.
Figure 2:
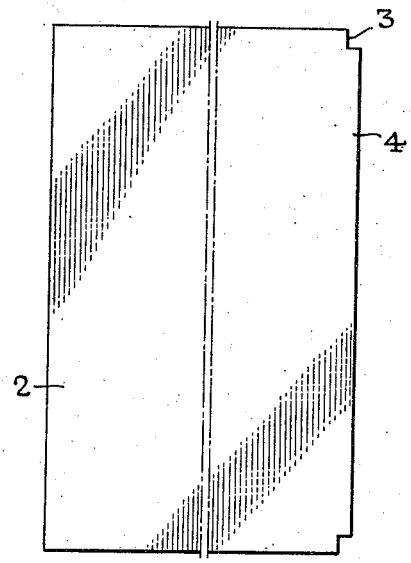
Figure 2 is a view of the body blank after it is notched and prepared for the forming of the can body.

Referring more in detail to the drawings, the can body 1 is made from a blank 2 which is notched at 3, 3 in the region where the can body is to be flanged for the securing of end members to the body by double seaming. The portion 4 between the notches 3, 3 is folded back upon itself as indicated in dotted lines in Figure 1 and in section in Figures 3 and 5. This folded back portion 4 is formed on the inner lap section.

Figure 3:
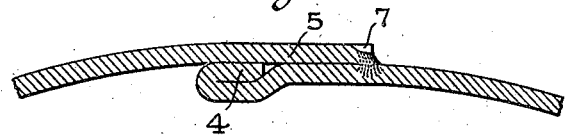
Figure 3 is a view on the line 3—3 of Figure 1 showing the lap sections joined by spot welding before the sealing of the seam by solder bond.
Figure 5:
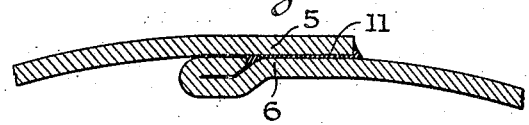
Figure 5 is a sectional view on the line 5—5 of Figure 1 after the seam has been sealed and the parts further joined by solder bonding.

In Figures 3 and 5 of the drawings the outer lap section is indicated at 5 and the inner lap section at 6. The folded back portion 4 only extends part-way across the transverse width of the side seam. The portion of the lap section 6 alongside of the folded back portion 4 is shaped so as to make intimate contact with the outer lap section 5 throughout the entire length of the side seam, including the end sections thereof beyond the folded back portion 4. After the body 2 has been curved about a forming horn and the edge portions lapped and the can body sized, then the outer lap section is joined to the inner lap section by spot welding at intervals as indicated at 7, 7 in Figures 1 and 3 of the drawings. These spot welds may be placed at the extreme edge of the outer lap section.

The side seam is preferably employed in a cylindrical can body. The curvature of the metal parts extends throughout the region of the side seam to some extent and the natural tendency of the outer lap section is to spring away from the inner lap section at the edge thereof. The edge of the inner lap section naturally springs outwardly and will be firmly contacted with the inner side of the outer lap section. The spot welding of the extreme edge of this outer lap section to the body wall ensures that the two lap sections shall be firmly contacted with each other and this greatly facilitates the solder bonding of the side seam.

Figure 4:
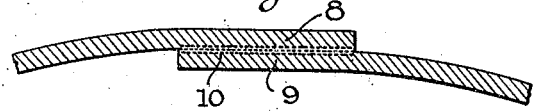
Figure 4 is a sectional view on the line 4—4 of Figure 1 showing the lap sections at the end of the can body joined by spot welding.

As shown in Figure 4, the outer lap section 8 at the end of the side seam makes intimate contact with the inner lap section 9. These lap sections may be initially joined by spot welding and subsequently joined and sealed by solder bonding, but preferably the lap sections are joined by a series of spot welds 10 which overlap and make a continuous weld between said lap sections. These end sections lying at the ends of the folded back portion of the side seam are subsequently shaped outwardly into a flange to which the ends are secured by a double seam. It will be noted that the folded back portion which provides three layers of metal terminates at these end sections so that there are only two layers of metal to be shaped into the flange and to be double seamed.

After the can body has been spot welded in the manner described above, it is subjected to a soldering mechanism of any desired construction wherein a solder bond 11 (see Fig. 5) is applied to the side seam throughout the entire length thereof. The solder will sweat in between the metal parts and not only assist in a firm joining of the parts, but also seal the same. It will be noted that on the inside of the can there is no exposed raw edge of metal. The folded back portion extends a sufficient distance between the lapped end sections so that in the double seaming of the closure ends to the can body, said folded back portion extends into the end seams and at no point on the interior of the can will a raw edge of metal be exposed to the contents.

It is noted that the can body may be formed about the usual horn and sized thereon and spot welded before it is released and presented to the soldering mechanism for solder bonding.

It will be understood, of course, that the solder bond will sweat into any spaces between the lapped sections at the ends of the side seam and further assist in joining the sections and in sealing the same.

It is obvious that minor changes in the details of construction may be made without departing from the spirit of the invention as set forth in the appended claim.

I claim:

A sheet metal can body comprising a body portion having the side edge portions lapped to form a side seam, the inner lap being notched at the ends thereof and a portion between the notches folded back upon itself so as to lie between the lapped end portions of the side seam, said folded back portion extending for only a small portion of the width of the side seam, the lap portions of the side seam along and beyond the inner edge of the folded back portion and at the ends thereof being shaped so as to make intimate contact with each other, said outer lap portion being joined to the inner lap portion by spot welding disposed at the extreme edge of the outer lap portion and at intervals along the same, and a solder bonding extending throughout the contacting surfaces of the side seam for joining and sealing the same.

PAUL E. PEARSON.

REFERENCES CITED

The following references are of record in the file of this patent:

UNITED STATES PATENTS

| Number | Name | Date |
| --- | --- | --- |
| 2,156,028 | Punte | Apr. 25, 1939 |
| 1,542,662 | Brenzinger | June 16, 1925 |
| 2,322,845 | Goldsworthy | June 29, 1943 |
| 2,255,802 | Murch | Sept. 16, 1941 |
| 2,124,004 | O'Neil | July 19, 1938 |
| 2,065,282 | Krueger | Dec. 22, 1936 |
| 1,556,651 | Walker | Oct. 13, 1925 |